(12) United States Patent
Ren et al.

(10) Patent No.: US 11,336,492 B2
(45) Date of Patent: May 17, 2022

(54) CHAOTIC SHAPE-FORMING AND MATCHED FILTER-BASED WIRELESS COMMUNICATION METHOD

(71) Applicant: Xi'an University of Technology, Shaanxi (CN)

(72) Inventors: Haipeng Ren, Shaanxi (CN); Junliang Yao, Shaanxi (CN); Chao Bai, Shaanxi (CN)

(73) Assignee: Xi'an University of Technology, Shaanxi (CN)

( * ) Notice: Subject to any disclaimer, the term of this patent is extended or adjusted under 35 U.S.C. 154(b) by 0 days.

(21) Appl. No.: 16/476,879

(22) PCT Filed: Apr. 28, 2019

(86) PCT No.: PCT/CN2019/084793
§ 371 (c)(1),
(2) Date: Jul. 10, 2019

(87) PCT Pub. No.: WO2019/206331
PCT Pub. Date: Oct. 31, 2019

(65) Prior Publication Data
US 2021/0336821 A1    Oct. 28, 2021

(30) Foreign Application Priority Data
Apr. 27, 2018  (CN) .......................... 201810394093.9

(51) Int. Cl.
*H04L 27/00* (2006.01)
(52) U.S. Cl.
CPC .................................. *H04L 27/001* (2013.01)
(58) Field of Classification Search
None
See application file for complete search history.

(56) References Cited

U.S. PATENT DOCUMENTS

2005/0249271 A1* 11/2005 Lau .......................... H04B 1/69
375/219
2014/0064410 A1    3/2014 Swarup

FOREIGN PATENT DOCUMENTS

CN    101605112 A    12/2009
CN    106341221 A     1/2017
(Continued)

OTHER PUBLICATIONS

H. Ren, S. Guo and C. Bai, "Multi-carrier Differential Chaos Shift Keying Wireless Communication Based On Chaotic Shape-forming Filter," 2019 Chinese Automation Congress (CAC), 2019, pp. 4208-4212, doi: 10.1109/CAC48633.2019.8996579 (Year: 2019).*

(Continued)

*Primary Examiner* — Nader Bolourchi
(74) *Attorney, Agent, or Firm* — Gang Yu (57) ABSTRACT a chaotic shape-forming and corresponding matched filter-based wireless communication method is provided, and the method includes that: 1) data to be transmitted is prepared; 2) chaotic shape-forming filter is performed on a digital symbol to be transmitted to generate a baseband signal; 3) the baseband signal is transmitted and transferred by use of a radio frequency component and transmitting antenna of a conventional wireless communication system; 4) a wireless signal is received by use of a conventional receiving antenna, and down-carrier process is performed on the received signal to obtain a received baseband signal; 5) matched filter is performed on the received baseband signal; 6) wireless channel estimation and multipath interference cancellation judgment threshold calculation are performed; and 7) sampling judgment is performed on an output signal of matched filter, symbol sampling is performed on the output signal of the matched filter in Step 5), and the (Continued)

sampled signal is judged by use of a judgment threshold calculated in Step 6) to obtain a decoded output signal.

17 Claims, 9 Drawing Sheets

(56) References Cited

FOREIGN PATENT DOCUMENTS

| | | |
|---|---|---|
| CN | 106452652 A | 2/2017 |
| CN | 108768905 A | 11/2018 |

OTHER PUBLICATIONS

C. Bai, H. Ren and C. Grebogi, "Experimental Phase Separation Differential Chaos Shift Keying Wireless Communication Based on Matched Filter," in IEEE Access, vol. 7, pp. 25274-25287, 2019, doi: 10.1109/ACCESS.2019.2900729. (Year: 2019).*

* cited by examiner

CHAOTIC SHAPE-FORMING AND MATCHED FILTER-BASED WIRELESS COMMUNICATION METHOD

TECHNICAL FIELD

Embodiments of the disclosure belong to the technical field of wireless communication, and relate to a chaotic shape-forming and matched filter-based wireless communication method.

BACKGROUND

Under the influence of physical properties of multipath, a doppler effect, and strong noises in a wireless channel, wireless communication performance is obviously lower than wired communication. Latest research results show that chaos is an optimal communication waveform and chaotic signals may overcome the influence of factors such as multipath of the wireless channel and are more suitable for wireless communication. However, a chaotic signal has a property of wide spectrum, and in a conventional wireless communication system, due to limits of properties of a communication system architecture and an antenna, it is difficult to transmit signals, hardware is highly complex, synchronization performance of a transmitter and a receiver is poor, and safety and robustness of the wireless communication system are poor, so that it is difficult to transmit chaotic signals in a wireless channel.

SUMMARY

The embodiments of the disclosure are intended to provide a chaotic shape-forming and matched filter-based wireless communication method, which solves the problems of difficulty in signal transmission, high hardware complexity, poor synchronization performance of a transmitter and a receiver and poor safety and robustness when a broadband chaotic signal is implemented on a conventional wireless communication platform.

According to one aspect of the embodiments of the disclosure, a data sending method is provided, which includes that: data to be transmitted is acquired; the data to be transmitted is processed by use of a chaotic shape-forming filter to obtain a baseband signal; and the baseband signal is sent.

Optionally, the operation that the data to be transmitted is processed by use of the chaotic shape-forming filter to obtain the baseband signal includes that: the baseband signal is generated by use of the following formula:

$$x(t) = \sum_{m=\lfloor t \rfloor}^{\lfloor t \rfloor + N_p} s_m \cdot p(t-m),$$

where t is a time variable, $\lfloor t \rfloor$ represents a rounding-down operation over the variable t, $N_p$ is a parameter related to a chaotic base function, m is a variable loop sequence number, $s_m$ represents an mth symbol to be transmitted, and p(t) is the chaotic basis function.

Optionally, an expression of p(t) is as follows:

$$p(t) = \begin{cases} (1-e^{-\beta})e^{\beta t}\left(\cos\omega t - \dfrac{\beta}{\omega}\sin\omega t\right), & t < 0 \\ 1 - e^{\beta(t-1)}\left(\cos\omega t - \dfrac{\beta}{\omega}\sin\omega t\right), & 0 \le t < 1 \\ 0, & t \ge 1 \end{cases},$$

where $\beta$ and $\omega$ are chaotic system parameters.

Optionally, the chaotic shape-forming filter includes a finite impulse response filter, $s_m$ is an mth element in an input symbol sequence of the chaotic shape-forming filter, the tap number of the chaotic shape-forming filter is $N_p+1$, and an nth tap coefficient $p_n$ is represented as follows:

$p_n = p(t - \lfloor t \rfloor - N_p + n), n = 0, 1, \ldots, N_p,$ where t is the time variable, $\lfloor t \rfloor$ represents the rounding-down operation over the variable t, and $N_p$ is the parameter related to the chaotic basis function.

Optionally, a valuing principle for $N_p$ is to make $p(t-N_p)$ close to 0.

Optionally, the operation that the baseband signal is sent includes that: the baseband signal is sent by use of a wireless transmission component in a conventional wireless communication system.

Optionally, the data to be transmitted includes that: a data frame structure is adopted for the data to be transmitted, and each frame is divided into two parts of a preamble sequence and a data sequence, the preamble sequence being configured for channel estimation and frame synchronization and the data sequence being valid data to be sent.

According to another aspect of the embodiments of the disclosure, a data receiving method is provided, which includes that: a baseband signal is received, the baseband signal being a signal obtained by processing data to be transmitted by use of a chaotic shape-forming filter; the baseband signal is processed by use of a matched filter to obtain demodulated data; channel estimation is performed by use of a preamble sequence in the demodulated data to obtain a channel parameter; a signal judgment threshold at a present sampling moment is determined on the basis of the channel parameter and the demodulated data; and symbol sampling is performed on the demodulated data, and a sampled symbol is judged by use of the signal judgment threshold to obtain a target signal.

Optionally, the operation that the baseband signal is processed by use of the matched filter includes that: matched filter is performed on the baseband signal to obtain an output signal of the matched filter, and data is extracted from the output signal to obtain the demodulated data.

Optionally, the output signal is:

$$y(t) = \sum_{m=\lceil t \rceil - N_C N_p}^{\lceil t \rceil} r(m)g(t-m),$$

where y(t) is the output signal, t is a time variable, $\lceil t \rceil$ is a rounding-up operation over the variable t, $N_C$ represents a chaotic symbol oversampling rate, r(m) is an mth element of an input signal sequence of the matched filter, and g(t) is a time inverse function of a chaotic basis function, namely g(t)=p(−t).

Optionally, the matched filter adopts a finite impulse response filter structure.

Optionally, the operation that channel estimation is performed by use of the preamble sequence in the demodulated data to obtain the channel parameter includes that: channel estimation is performed on the preamble sequence by use of a least square method to obtain channel parameters $\tau_l$ and $\alpha_l$, l being a multipath sequence number and $\tau_l$ and $\alpha_l$ being delay time and attenuation coefficient of an lth path respectively.

The operation that the signal judgment threshold at the present sampling moment is determined on the basis of the channel parameter and the demodulated data includes that: the signal judgment threshold is calculated by use of the following formula:

$$\theta_n = \Sigma_{l=0}^{L-1} \Sigma_{i=\lceil -\tau_l \rceil}^{-1} s_{n+i} C_{l,i},$$

where $s_{n+i}$ is a symbol at an n+ith sampling moment, L is the number of multipaths, i is a symbol loop variable, and inter-symbol interference $C_{l,i}$ of an ith symbol of an lth path at the present moment is calculated as follows:

$$C_{l,i} = \alpha_l \int_{\tau=-\infty}^{\infty} p(\tau) p(\tau + \tau_l + i) d\tau.$$

Optionally, if a sampling signal at an nth sampling moment is represented as $y_n$, signal judgment at this moment is performed as follows:

$$s_n = \begin{cases} 1, & (y_n \geq \theta_n) \\ -1, & (y_n < \theta_n) \end{cases},$$

where $\theta_n$ is the signal judgment threshold.

According to another aspect of the embodiments of the disclosure, a data sending device is provided, which includes: an acquisition component, configured to acquire data to be transmitted; a processing component, configured to process the data to be transmitted by use of a chaotic shape-forming filter to obtain a baseband signal; and a sending component, configured to send the baseband signal.

According to another aspect of the embodiments of the disclosure, a data receiving device is provided, which includes: a receiving component, configured to receive a baseband signal, the baseband signal being a signal obtained by processing data to be transmitted by use of a chaotic shape-forming filter; a processing component, configured to process the baseband signal by use of a matched filter to obtain demodulated data; a channel estimation component, configured to perform channel estimation by use of a preamble sequence in the demodulated data to obtain a channel parameter; a determination component, configured to determine a signal judgment threshold at a present sampling moment on the basis of the channel parameter and the demodulated data; and a judgment component, configured to perform symbol sampling on the demodulated data and judge a sampled symbol by use of the signal judgment threshold to obtain a target signal.

According to the technical solution adopted in the embodiments of the disclosure, a chaotic shape-forming and matched filter-based wireless communication method is implemented according to the following steps:

Step 1): data to be transmitted is prepared, wherein a data frame structure is adopted for the data to be transmitted, and each frame is divided into two parts of a preamble sequence and a data sequence, the preamble sequence being configured for channel estimation and frame synchronization and the data sequence being valid data to be sent;

Step 2): chaotic shape-forming filtering is performed on a digital symbol to be transmitted to generate a baseband signal, wherein the baseband signal generated by use of a chaotic shape-forming filter is represented as follows:

$$x(t) = \sum_{m=\lfloor t \rfloor}^{\lfloor t \rfloor + N_p} s_m \cdot p(t-m),$$

where t is a time variable, $\lfloor t \rfloor$ represents a rounding-down operation over the variable t, $N_p$ is a parameter related to a chaotic basis function, m is a variable loop sequence number, $s_m$ represents an mth symbol to be transmitted, and an expression of p(t) is as follows:

$$p(t) = \begin{cases} (1-e^{-\beta})e^{\beta t}\left(\cos\omega t - \dfrac{\beta}{\omega}\sin\omega t\right), & t < 0 \\ 1-e^{\beta(t-1)}\left(\cos\omega t - \dfrac{\beta}{\omega}\sin\omega t\right), & 0 \leq t < 1 \\ 0, & t \geq 1 \end{cases},$$

where $\beta$ and $\omega$ are chaotic system parameters;

Step 3): the baseband signal is transmitted and transferred by use of a radio frequency component and transmitting antenna of a conventional wireless communication system;

Step 4): a wireless signal is received by use of a conventional receiving antenna, and down-carrier is performed on the received signal to obtain the received baseband signal;

Step 5): matched filter is performed on the received baseband signal, wherein an output signal of a chaotic matched filter is:

$$y(t) = \sum_{m=\lceil t \rceil - N_C N_p}^{\lceil t \rceil} r(m) g(t-m),$$

where y(t) is the output signal, t is the time variable, $\lceil t \rceil$ is a rounding-up operation over the variable t, $N_C$ represents a chaotic symbol oversampling rate, r(m) is an mth element of an input signal sequence of the matched filter, and g(t) is a time inverse function of the chaotic basis function, namely g(t)=p(−t), the matched filter adopts a finite impulse response filter structure, the number of taps is $N_C N_p + 1$, and an mth tap coefficient $g_m$ is represented as follows:

$$g_m = g(t - \lceil t \rceil m), m = 0, 1, \ldots, N_C N_p;$$

Step 6): wireless channel estimation and multipath interference cancellation judgment threshold calculation are performed, wherein a delay and attenuation parameter of a wireless channel are estimated by use of the preamble sequence and a channel estimation algorithm, a signal judgment threshold at a present moment is calculated by use of an estimated channel parameter in combination with a chaotic characteristic and a demodulated symbol, and for a wireless channel including L paths, an estimated delay and attenuation coefficient of an lth path of the channel are $\tau_l$ and $\alpha_l$ respectively, l=0, 1, 2, . . . , L−1 response values exist only delay points of the L paths, and a channel impulse response is represented as $h(t) = \Sigma_{l=0}^{L-1} \alpha_l \delta(t-\tau_l)$, where $\delta(t)$ is a unit impulse response, and $\tau_l$ and $\alpha_l$ are channel parameters;

Step 7): sampling judgment is performed on the output signal of matched filter, wherein symbol sampling is performed on the output signal of the matched filter in Step 5), and a sampling signal is judged by use of the judgment threshold calculated in Step 6) to obtain a decoded output signal.

The embodiments of the disclosure have the following beneficial effects. The baseband signal is generated by use of the chaotic shape-forming filter, and the corresponding matched filter is configured to reduce influence of noises to improve safety and robustness of the conventional wireless communication system and implement transmission and reception of a chaotic signal in the conventional wireless digital communication system. The following specific advantages are achieved.

1) The chaotic baseband signal is used instead of a conventional chaotic carrier signal, so that a signal bandwidth is greatly reduced, the method is more suitable for bandwidth-restricted wireless communication, and the biggest problem about disclosure of chaos to wireless communication is solved.

2) The chaotic shape-forming filter is used for a chaotic waveform generation process instead of a conventional pulse control method. A finite impulse response filter is adopted to implement the required forming filter in a digital circuit, so that software and hardware complexity in generation of a chaotic waveform is reduced.

3) A receiver adopts the corresponding matched filter to process the received chaotic signal, so that a received signal to noise ratio of the system may be maximized, and meanwhile, complex synchronization required by conventional chaotic communication is avoided.

4) The receiver adopts a reasonably set judgment threshold for symbol judgment on the basis of a chaotic characteristic of the signal, so that inter-symbol interference brought by wireless multipath is effectively canceled, and channel equalization required by conventional wireless communication is avoided.

BRIEF DESCRIPTION OF THE DRAWINGS

The drawings described herein are adopted to provide a further understanding to the embodiments of the disclosure and form a part of the disclosure. Schematic descriptions about the embodiments of the disclosure are adopted to explain the embodiments of the disclosure and not intended to form improper limits to the embodiments of the disclosure. In the drawings.

DETAILED DESCRIPTION OF THE EMBODIMENTS

Figure 1:
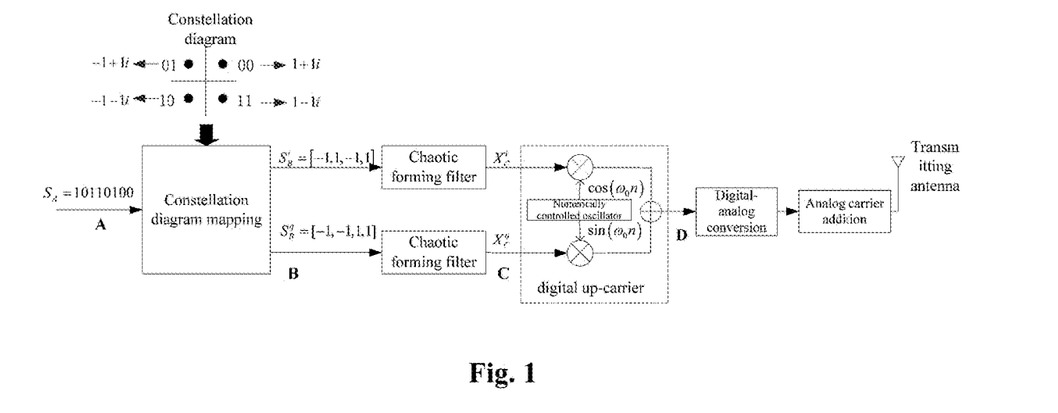
FIG. 1 is an implementation block diagram of a chaotic transmission structure adopted for a method according to an embodiment of the disclosure.

FIG. 1 is a functional block diagram of a chaotic transmission structure (transmitter of a chaotic wireless communication system) adopted for a method according to an embodiment of the disclosure, including five parts of constellation diagram mapping, chaotic forming filtering (a chaotic forming filter is adopted), digital carrier frequency addition, digital-to-analog conversion and analog carrier frequency addition. The chaotic transmission structure is different from a conventional wireless digital communication transmitter structure in that a pair of chaotic shape-forming filters are added. In FIG. 1, signals of input ports A, B, C and D are represented as $S_A$, $S_B$, $X_C$ and $X_D$ respectively; and upper and lower paths between the port B and the port C are an in-phase signal path and an orthogonal signal path after digital baseband modulation respectively, so that $S_B^i$ and $S_B^q$ are an in-phase component and orthogonal component of the signal $S_B$ of the port B, and $X_C^i$ and $X_C^q$ are an in-phase component and orthogonal component of the signal $X_C$ of the port C. Design and implementation of the chaotic forming filter will be described in subsequent steps in detail.

Figure 2:
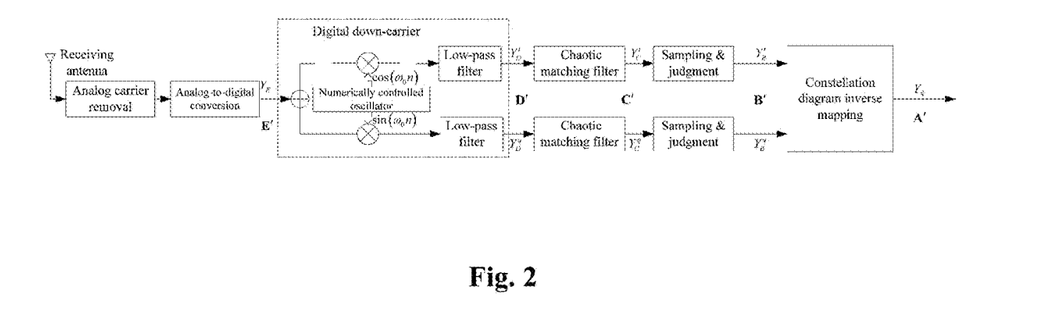
FIG. 2 is an implementation block diagram of a chaotic receiving structure adopted for a method according to an embodiment of the disclosure.

FIG. 2 is a block diagram of a chaotic receiving structure (a receiver of a chaotic wireless communication system) adopted for a method according to an embodiment of the disclosure. FIG. 2 is equivalent to an inverse process of FIG. 1, and includes six parts of analog carrier removal, analog-to-digital conversion, digital down-carrier, matched filter (a matched filter is adopted), sampling judgment and constellation diagram inverse mapping. In FIG. 2, signals of input ports A', B', C', D' and E' are represented as $Y_A$, $Y_B$, $Y_C$, $Y_D$ and $Y_E$ respectively; and upper and lower paths between the port B' and the port D' are an in-phase signal path and orthogonal signal path of a digital baseband signal respectively, $Y_B^i$ and $Y_B^q$ are an in-phase component and orthogonal component of the signal $Y_B$ of the port B', $Y_C^i$ and $Y_C^q$ are an in-phase component and orthogonal component of the signal $Y_C$ of the port C', and $Y_D^i$ and $Y_D^q$ are an in-phase component and orthogonal component of the signal $Y_D$ of the port D'. Design and implementation of the matched filter and a sampling judgment method will be elaborated in subsequent steps.

Based on the abovementioned transmitter and receiver structures, a chaotic shape-forming filter and matched filter-based wireless communication method of the embodiments of the disclosure is specifically implemented according to the following steps.

Step 1): data to be transmitted is prepared.

Figure 3:
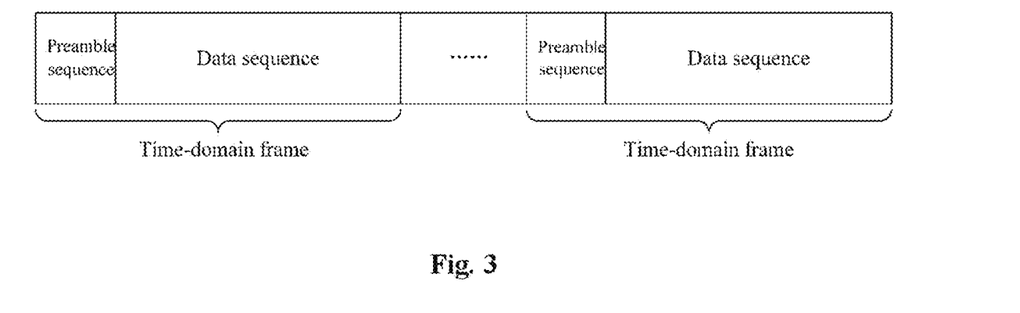
FIG. 3 is a system data frame structure for a method according to an embodiment of the disclosure.

As shown in FIG. 3, a data frame structure is adopted for the data to be transmitted, and each frame is divided into two parts of a preamble sequence and a data sequence, the preamble sequence being configured for channel estimation and frame synchronization and the data sequence being valid data to be sent. It is also necessary to perform digital baseband modulation (constellation diagram mapping) on the data to be transmitted according to a practical condition.

Step 2): chaotic shape-forming filtering is performed on a digital symbol to be transmitted to generate a baseband signal.

The baseband signal generated by use of a chaotic shape-forming filter is represented as follows:

$$x(t) = \sum_{m=\lfloor t \rfloor}^{\lfloor t \rfloor + N_p} s_m \cdot p(t-m), \quad (1)$$

where t is a time variable, $\lfloor t \rfloor$ represents a rounding-down operation over the variable t, $N_p$ is a parameter related to a chaotic basis function, m is a variable loop sequence number, $s_m$ represents an mth symbol to be transmitted, and an expression of p(t) is as follows:

$$p(t) = \begin{cases} (1-e^{-\beta})e^{\beta t}\left(\cos\omega t - \frac{\beta}{\omega}\sin\omega t\right), & t < 0 \\ 1 - e^{\beta(t-1)}\left(\cos\omega t - \frac{\beta}{\omega}\sin\omega t\right), & 0 \leq t < 1 \\ 0, & t \geq 1 \end{cases} \quad (2)$$

where β and ω are chaotic system parameters, and values are required to be determined according to a requirement of a communication system. Under a normal condition, β=ln 2 and ω=2π.

Figure 4:
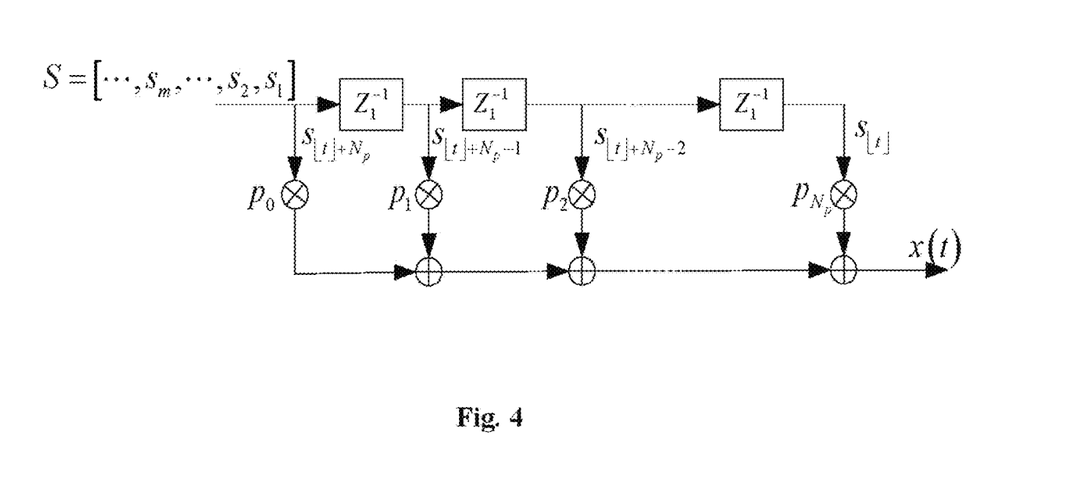
FIG. 4 is an implementation block diagram of a chaotic shape-forming filter designed for a method according to an embodiment of the disclosure.

During specific digital implementation, the chaotic shape-forming filter adopts a finite impulse response filter structure, and an implementation block diagram is shown in FIG. 4. In the figure, S is an input symbol sequence of the chaotic shape-forming filter, $s_m$ is an mth element of the sequence, and $Z_1^{-1}$ is a delay of a unit symbol of the input sequence of the chaotic shape-forming filter. The number of taps of the chaotic shape-forming filter is $N_p+1$, tap coefficients from left to right are represented as $p_0, p_1, \ldots, p_{N_p}$ respectively, and an nth tap coefficient $p_n$ is represented as follows:

$$p_n = p(t - \lfloor t \rfloor - N_p + n), n = 0, 1, \ldots, N_p, \quad (3)$$

For the chaotic shape-forming filter, if a value of $N_p$ is larger, filtering performance is higher, but algorithm complexity is also higher. Therefore, a valuing principle for $N_p$ in the step is to make $p(t-N_p)$ close to 0, where $p(t-N_p)$ is a state value of the chaotic basis function at a moment $t-N_p$, and it can be seen that the requirement is satisfied for the chaotic basis function, $N_p=6$.

Step 3): the baseband signal is transmitted and transferred by use of a radio frequency component and transmitting antenna of a conventional wireless communication system.

Step 4): a wireless signal is received by use of a conventional receiving antenna, and down-carrier process is performed on the received signal to obtain the received baseband signal.

Step 5): matched filtering is performed on the received baseband signal.

An output signal of a matched filter is:

$$y(t) = \sum_{m=\lceil t \rceil - N_C N_p}^{\lceil t \rceil} r(m) g(t-m), \quad (4)$$

where y(t) is the output signal, t is the time variable, $\lceil t \rceil$ is a rounding-up operation over the variable t, $N_C$ represents a chaotic symbol oversampling rate, r(m) is an mth element of an input signal sequence of the matched filter, and g(t) is a time inverse function of the chaotic basis function, namely g(t)=p(-t).

The matched filter adopts a finite impulse response filter structure, the number of taps is $N_C N_p + 1$, and an mth tap coefficient $g_m$ is represented as follows:

$$g_m = g(t - \lceil t \rceil + m), m = 0, 1, \ldots, N_C N_p.$$

Figure 5:
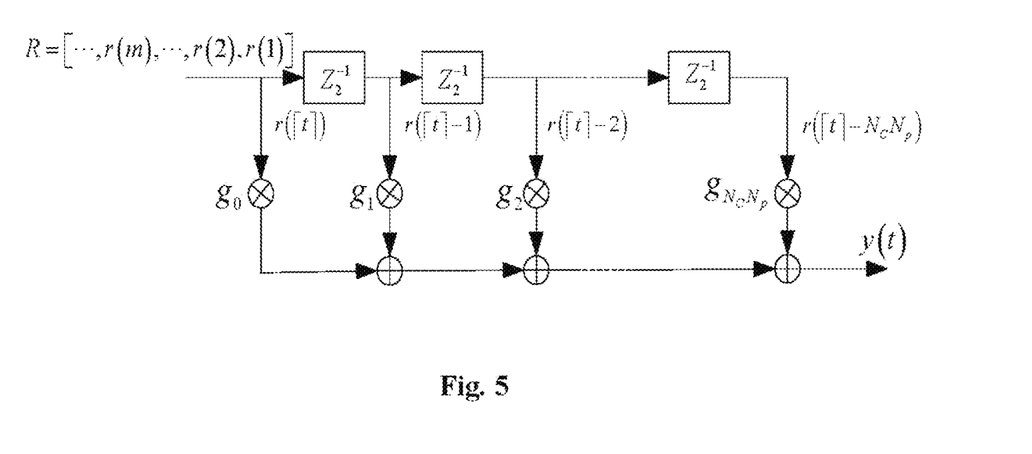
FIG. 5 is an implementation block diagram of a matched filter designed for a method according to an embodiment of the disclosure.

During specific digital implementation, the matched filter adopts the finite impulse response filter structure, and an implementation block diagram is shown in FIG. 5. In FIG. 5, R=[ ..., r(m), ..., r(2), r(1)] is the input symbol sequence of the matched filter, and $Z_2^{-1}$ is a delay of a unit symbol of the input sequence. The number of the taps of the matched filter is $N_C N_p + 1$, where $N_C$ represents the chaotic symbol oversampling rate, the tap coefficients from left to right are represented as $g_0, g_1, \ldots, g_{N_C N_p}$ respectively, and the mth tap coefficient $g_m$ is represented as follows:

$$g_m = g(t - \lceil t \rceil + m), m = 0, 1, \ldots, N_C N_p, \quad (5).$$

Step 6): wireless channel estimation and multipath interference elimination judgment threshold calculation are performed.

A delay and attenuation parameter of a wireless channel are estimated by use of the preamble sequence and a channel estimation algorithm, and a signal judgment threshold at a present moment is calculated by use of an estimated channel parameter in combination with a chaotic characteristic and a demodulated symbol. If the wireless multipath channel practically includes L paths, an estimated delay and attenuation coefficient of an Lth path of the channel are $\tau_l$ and $\alpha_l$ respectively, l=0, 1, 2, ..., L−1, response values exist only delay points of the L paths, and a channel impulse response is represented as $h(t)=\sum_{l=0}^{L-1}\alpha_l\delta(t-\tau_l)$, where δ(t) is a unit impulse response, and $\tau_l$ and $\alpha_l$ are channel parameters. A least square method is specifically adopted to estimate the channel parameter, and the estimated channel parameters $\tau_l$ and $\alpha_l$ are utilized, where l is the multipath sequence number, and $\tau_l$ and $\alpha_l$ are delay time and attenuation coefficient of the lth path respectively. The output signal y(t) of matched filter in Step 5) is sampled, and a judgment threshold at an nth sampling moment is calculated as follows:

$$\theta_n = \sum_{l=0}^{L-1} \sum_{i=\lceil -\tau_l \rceil}^{-1} s_{n+i} C_{l,i}, \quad (6),$$

where $s_{n+i}$ is a symbol at an n+ith sampling moment, L is the number of multi-paths, and i is a symbol loop variable. Because of the variable i≤−1 in Eq. (7), a value of $s_{n+i}$ at the nth sampling moment is known. Inter-symbol interference $C_{l,i}$ of an ith symbol of an lth path at the present moment is calculated as follows:

$$C_{l,i}=a_l\int_{\tau=-\infty}^{\infty}p(\tau)p(\tau+\tau_l+i)d\tau, \quad (7).$$

The judgment threshold comprehensively considers a chaotic system property and a wireless channel parameter, and may effectively reduce inter-symbol interference brought by wireless multipath transmission and improve BER performance of a receiver.

Step 7): sampling judgment is performed on the output signal of matched filter.

Symbol sampling is performed on the output signal of the matched filter in Step 5), and a sampling signal is judged by use of the judgment threshold calculated in Step 6) to obtain a decoded output signal.

If a sampling signal at the nth sampling moment is represented as $y_n$, signal judgment at this moment is performed as follows:

$$s_n = \begin{cases} 1 & (y_n \geq \theta_n) \\ -1 & (y_n < \theta_n), \end{cases} \quad (8)$$

According to the chaotic shape-forming and corresponding matched filter-based wireless communication method of the embodiments of the disclosure, chaos is used as a communication baseband waveform, and a conventional sinusoidal carrier is used as a communication carrier. For achieving compatibility with an existing wireless communication system, finite impulse response filter structures are adopted to implement the chaotic shape-forming filter of the transmitter and the matched filter corresponding to the receiver, thereby obtaining a chaotic waveform gain and also greatly reducing system implementation complexity.

Figure 12:
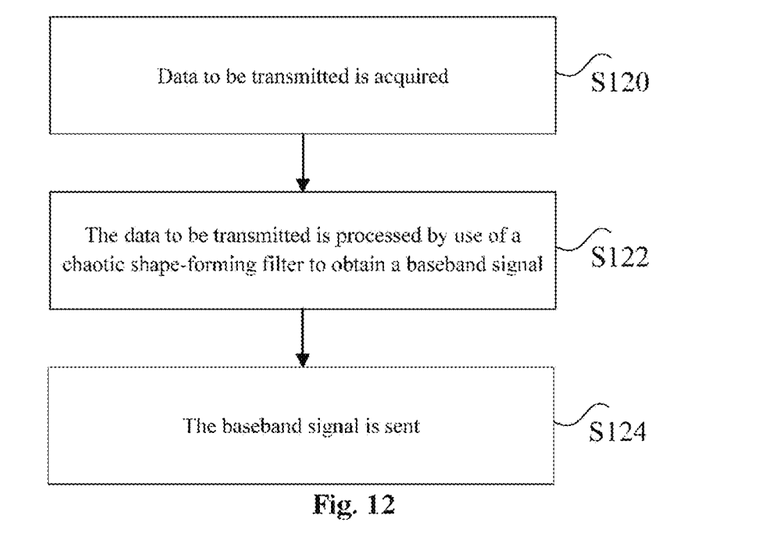
FIG. 12 is a flowchart of a data sending method according to the embodiment of the disclosure.

An embodiment of the disclosure also provides a data sending method, which, as shown in FIG. 12, includes the following steps.

In S120, data to be transmitted is acquired.

In S122, the data to be transmitted is processed by use of a chaotic shape-forming filter to obtain a baseband signal.

In S124, the baseband signal is sent.

The operation that the data to be transmitted is processed by use of the chaotic shape-forming filter to obtain the baseband signal includes that: the baseband signal is generated by use of the following equation:

$$x(t) = \sum_{m=\lfloor t \rfloor}^{\lfloor t \rfloor + N_p} s_m \cdot p(t-m),$$

where t is a time variable, $\lfloor t \rfloor$ represents a rounding-down operation over the variable t, $N_p$ is a parameter related to a chaotic basis function, m is a variable loop sequence number, $s_m$ represents an mth symbol to be transmitted, and p(t) is the chaotic basis function.

Herein, an expression of p(t) is as follows:

$$p(t) = \begin{cases} (1-e^{-\beta})e^{\beta t}\left(\cos\omega t - \dfrac{\beta}{\omega}\sin\omega t\right), & t < 0 \\ 1-e^{\beta(t-1)}\left(\cos\omega t - \dfrac{\beta}{\omega}\sin\omega t\right), & 0 \leq t < 1 \\ 0, & t \geq 1 \end{cases}$$

where $\beta$ and $\omega$ are chaotic system parameters.

Preferred implementation modes of the embodiment may refer to above related descriptions and will not be elaborated herein.

Figure 13:
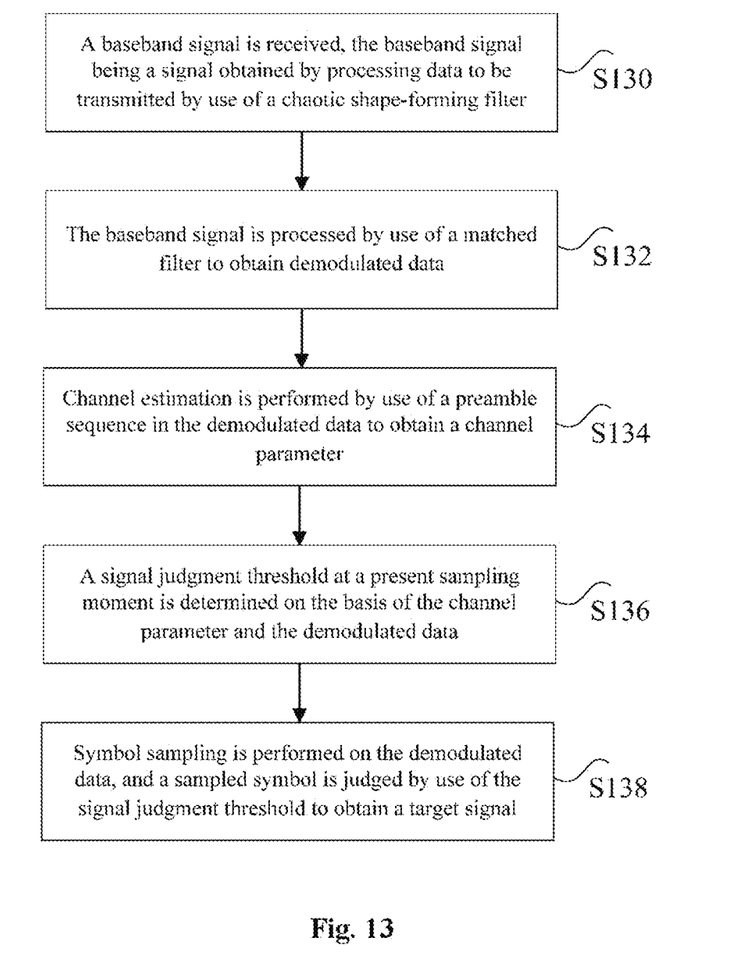
FIG. 13 is a flowchart of a data receiving method according to the embodiment of the disclosure.

An embodiment of the disclosure also provides a data receiving method, which, as shown in FIG. 13, includes the following steps.

In S130, a baseband signal is received, the baseband signal being a signal obtained by processing data to be transmitted by use of a shape-forming filter.

In S132, the baseband signal is processed by use of a matched filter to obtain demodulated data.

In S134, channel estimation is performed by use of a preamble sequence in the demodulated data to obtain a channel parameter.

In S136, a signal judgment threshold at a present sampling moment is determined on the basis of the channel parameter and the demodulated data.

In S138, symbol sampling is performed on the demodulated data, and a sampled symbol is judged by use of the signal judgment threshold to obtain a target signal.

Optionally, the operation that the baseband signal is processed by use of the matched filter includes that: matched filter is performed on the baseband signal to obtain an output signal of the matched filter, and data is extracted from the output signal to obtain the demodulated data. Herein, the output signal is:

$$y(t) = \sum_{m=\lceil t \rceil - N_C N_p}^{\lceil t \rceil} r(m)g(t-m),$$

where y(t) is the output signal, t is a time variable, $\lceil t \rceil$ is a rounding-up operation over the variable t, $N_C$ represents a chaotic symbol oversampling rate, r(m) is an mth element of an input signal sequence of the matched filter, and g(t) is a time inverse function of a chaotic basis function, namely g(t)=p(−t).

Figure 14:
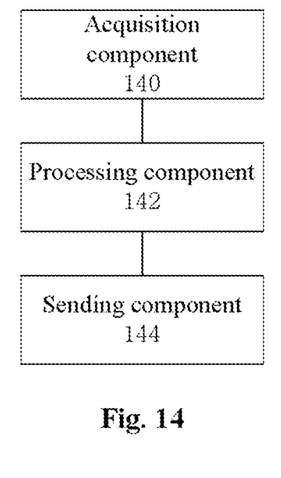
FIG. 14 is a structural schematic diagram of a data sending according to the embodiment of the disclosure.

An embodiment of the disclosure provides a data sending device, which is configured to implement the method shown in FIG. 12. As shown in FIG. 14, the device includes:

an acquisition component 140, configured to acquire data to be transmitted;

a processing component 142, configured to process the data to be transmitted by use of a chaotic shape-forming filter to obtain a baseband signal; and a sending component 144, configured to send the baseband signal.

Figure 15:
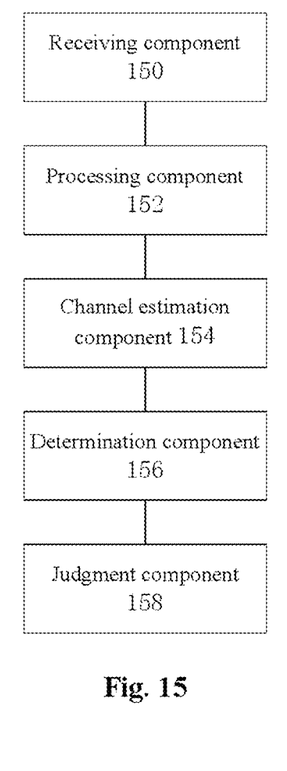
FIG. 15 is a structural schematic diagram of a data receiving device according to the embodiment of the disclosure.

An embodiment of the disclosure provides a data receiving device, which is configured to implement the method shown in FIG. 13. As shown in FIG. 15, the device includes:

a receiving component 150, configured to receive a baseband signal, the baseband signal being a signal obtained by processing data to be transmitted by use of a chaotic shape-forming filter;

a processing component 152, configured to process the baseband signal by use of a matched filter to obtain demodulated data;

a channel estimation component 154, configured to perform channel estimation by use of a preamble sequence in the demodulated data to obtain a channel parameter;

a determination component 156, configured to determine a signal judgment threshold at a present sampling moment on the basis of the channel parameter and the demodulated data; and a judgment component 158, configured to perform symbol sampling on the demodulated data and judge a sampled symbol by use of the signal judgment threshold to obtain a target signal.

Experiments for Verification

In a practical wireless channel environment, performance of a chaotic wireless communication method disclosed in the embodiments of the disclosure is verified. In the experiments, a system carrier frequency is 2.4 GHz, a system bandwidth is 20 MHz, and each of transmission and receiving nodes adopts a single antenna for point-to-point transmission. A test scenario is short-distance transmission in a campus (a transmission distance is 25~30 meters), a time sequence structure and time-domain frame structure of a transmitted signal are shown in FIG. 3, and a verification result is obtained by averaging transmission results of 100 frames. BER performance of totally four methods is tested, and the four methods are the method of the embodiments of the disclosure in case of a judgment threshold 0, the method of the embodiments of the disclosure in case of a judgment threshold $\theta_n$, a channel equalization-free conventional non-chaotic method and a channel equalization-based conventional non-chaotic method respectively, and a Minimum Mean Square Error (MMSE) algorithm is adopted for channel equalization.

First Experiment

Figure 6:
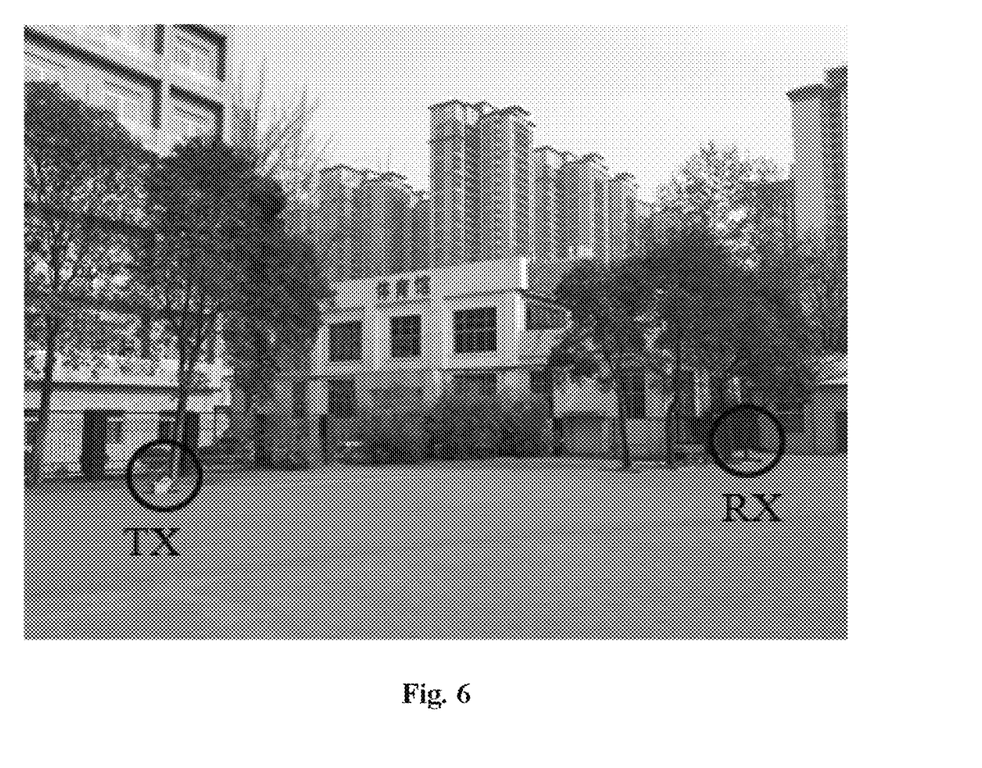
FIG. 6 is a test picture of a scenario of a first experiment of a method according to an embodiment of the disclosure.
Figure 7:
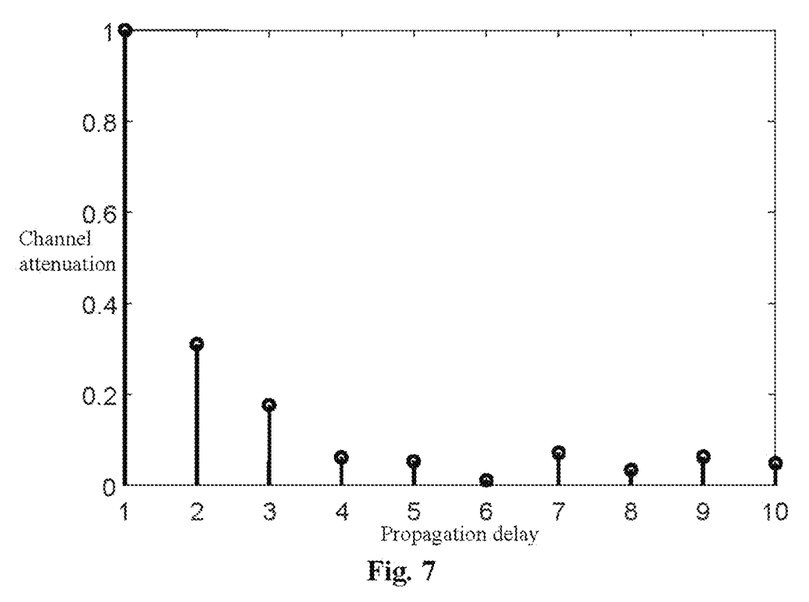
FIG. 7 is a normalization channel parameter of the scenario of the first experiment of the method according to the embodiment of the disclosure.
Figure 8:
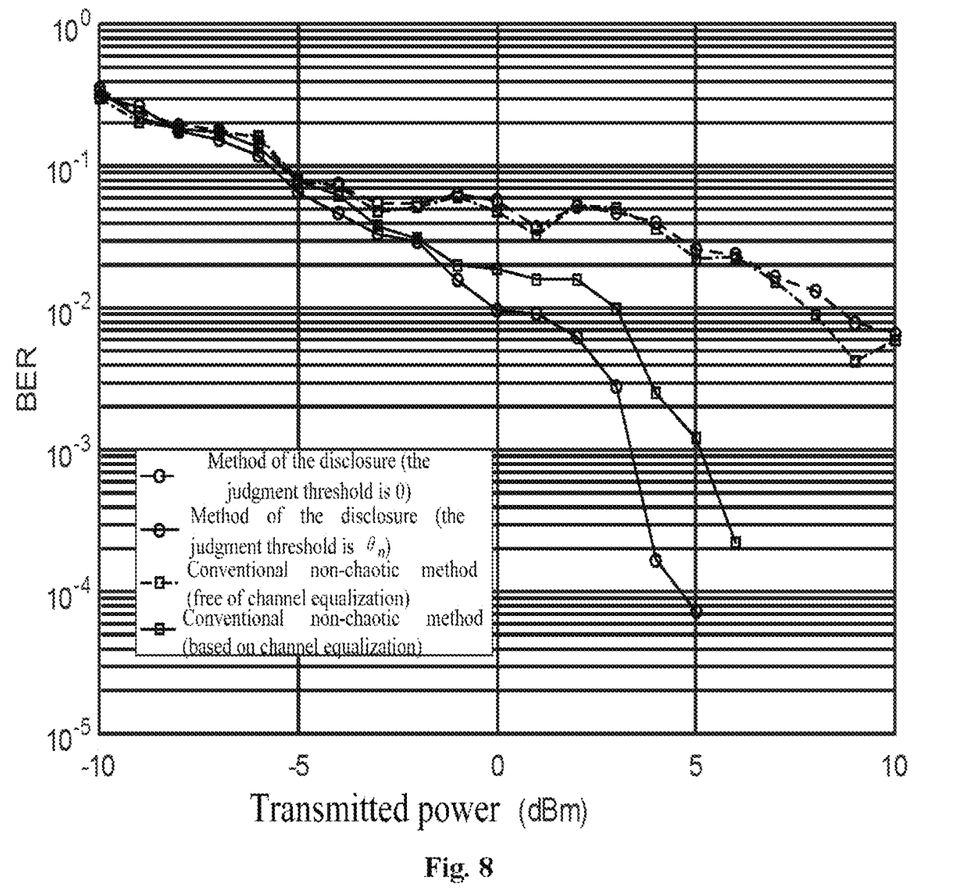
FIG. 8 show curves of Bit Error Rates (BERs) of the method according to the embodiment of the disclosure and a conventional non-chaotic method under different transmitted power in the scenario of the first experiment of the method according to the embodiment of the disclosure.

FIG. 6 is a test picture of a scenario of the first experiment. In FIG. 6, TX represents the transmitter, RX represents the receiver, a distance between the transmitter and the receiver is about 30 meters, and there are many buildings and trees around. A preamble sequence and a least square channel estimation algorithm are utilized. FIG. 7 shows estimated channel coefficients of the scenario. In FIG. 7, power normalization is performed on a first path by use of the channel parameter. It can be seen that the scenario includes three main paths, and the channel coefficients are 1, 0.31 and 0.17 respectively. Power of the transmitter is regulated, and changing curves of BERs of the four algorithms along with the transmitted power are shown in FIG. 8. It can be seen that the BER performance of the algorithm of the embodiments of the disclosure in case of the judgment threshold 0 and the channel equalization-free conventional non-chaotic method is poorest, the performance of the conventional non-chaotic method based on MMSE channel equalization is improved to a certain extent, and the performance of the method of the embodiments of the disclosure in case of the judgment threshold $\theta_n$ is highest.

Second Experiment

Figure 9:
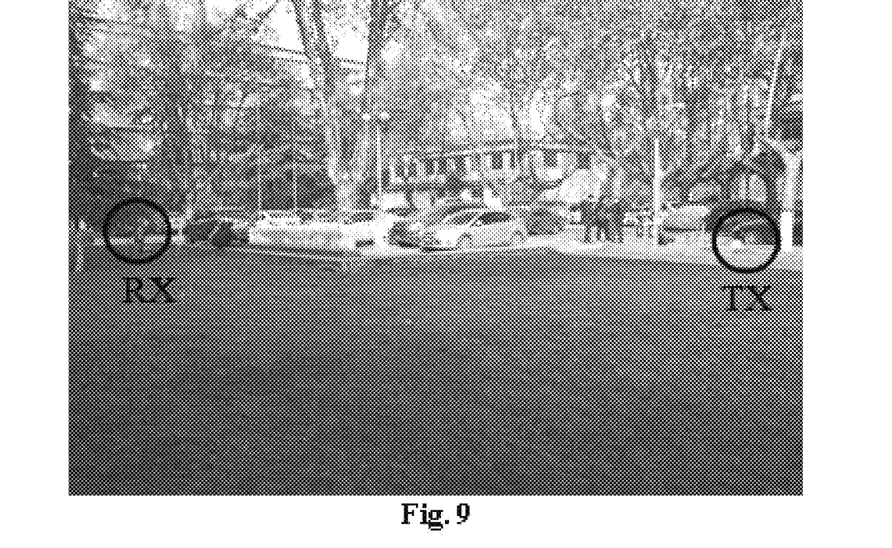
FIG. 9 is a test picture of a scenario of a second experiment of a method according to an embodiment of the disclosure.
Figure 10:
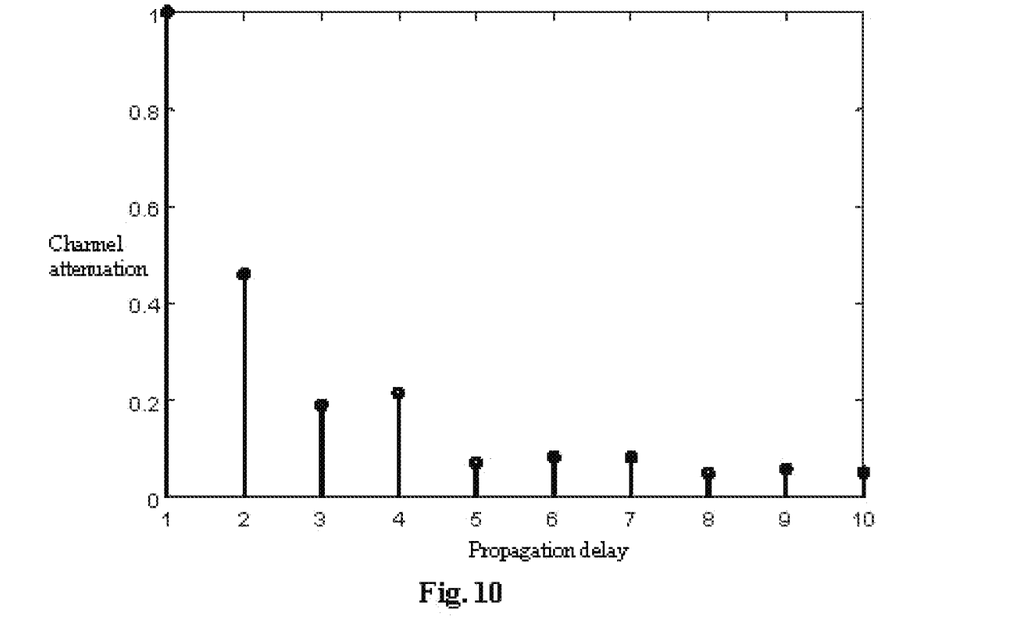
FIG. 10 is a normalization channel parameter of the scenario of the second experiment of the method according to the embodiment of the disclosure.
Figure 11:
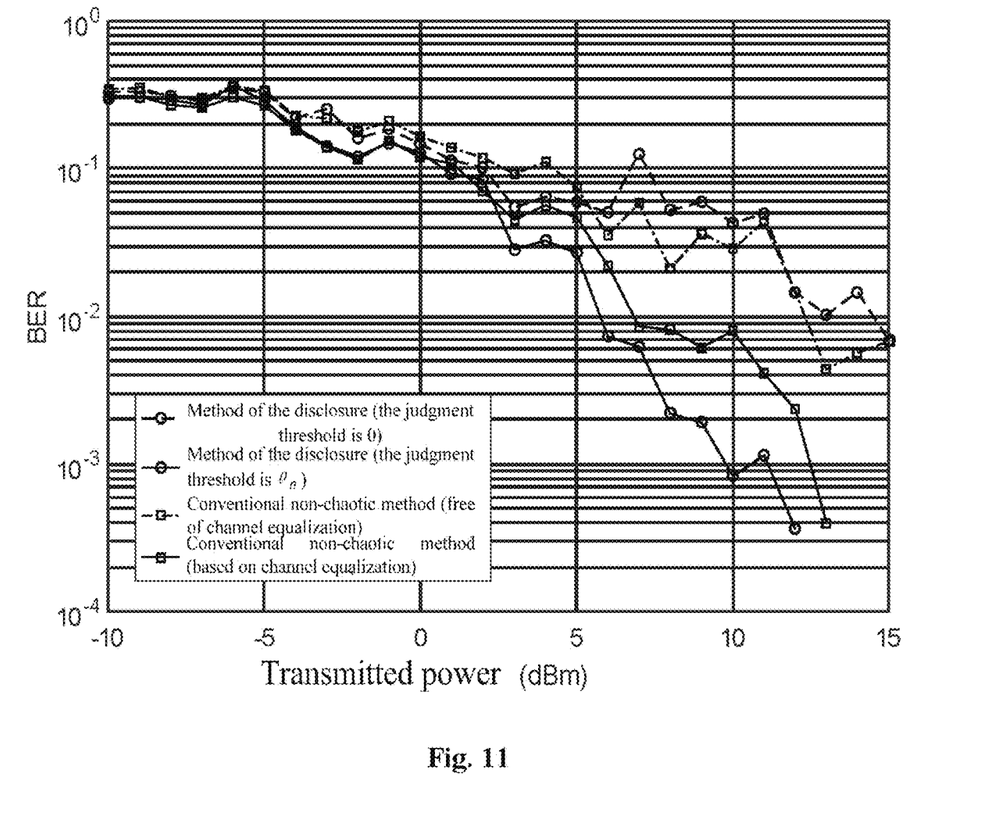
FIG. 11 show curves of BERs of the method according to the embodiment of the disclosure and a conventional non-chaotic method under different transmitted power in the scenario of the second experiment of the method according to the embodiment of the disclosure.

FIG. 9 is a test picture of a scenario of the second experiment. In FIG. 9, TX represents the transmitter, RX represents the receiver, there is no line of sight transmission for the transmitter and the receiver, and a distance is about 25 meters. FIG. 10 shows normalized estimated channel coefficients of the scenario. It can be seen that the scenario includes four main paths, and the channel coefficients are 1, 0.46, 0.19 and 0.21 respectively. Curves of BER performance of the four algorithms along with the transmitted power are shown in FIG. 11. Similar to test results of the first scenario, the BER performance of the method of the embodiments of the disclosure in case of the judgment threshold $\theta_n$ is highest.

Comparison between the experimental results shows that, in a practical wireless transmission scenario, the method of the embodiments of the disclosure has higher BER performance than a conventional method.

What is claimed is:

1. A data sending method, comprising:
   acquiring data to be transmitted;
   processing the data to be transmitted by use of a chaotic shape-forming filter to obtain a baseband signal; and
   sending the baseband signal;
   wherein processing the data to be transmitted by use of the chaotic shape-forming filter to obtain the baseband signal comprises: generating the baseband signal by use of the following formula:

$$x(t) = \sum_{m=\lfloor t \rfloor}^{\lfloor t \rfloor + N_p} s_m \cdot p(t-m),$$

where t is a time variable, $\lfloor t \rfloor$ represents a rounding-down operation over the variable t, $N_p$ is a parameter related to a chaotic basis function, m is a variable loop sequence number, $s_m$ represents an mth symbol to be transmitted, and p(t) is the chaotic basis function.

2. The method as claimed in claim 1, wherein an expression of p(t) is as follows:

$$p(t) = \begin{cases} (1-e^{-\beta})e^{\beta t}\left(\cos\omega t - \frac{\beta}{\omega}\sin\omega t\right), & t < 0 \\ 1 - e^{\beta(t-1)}\left(\cos\omega t - \frac{\beta}{\omega}\sin\omega t\right), & 0 \le t < 1 \\ 0, & t \ge 1 \end{cases}$$

where $\beta$ and $\omega$ are chaotic system parameters.

3. The method as claimed in claim 1, wherein the chaotic shape-forming filter comprises a finite impulse response filter, $s_m$ is an mth element in an input symbol sequence of the chaotic shape-forming filter, the tap number of the chaotic shape-forming filter is $N_p+1$, and an nth tap coefficient $p_n$ is represented as follows:

$$p_n = p(t-\lfloor t \rfloor - N_p + n), n=0,1,\ldots,N_p,$$

where t is the time variable, $\lfloor t \rfloor$ represents the rounding-down operation over the variable t, and $N_p$ is the parameter related to the chaotic base function.

4. The method as claimed in claim 3, wherein a valuing principle for $N_p$ is to make $p(t-N_p)$ close to 0.

5. The method as claimed in claim 1, wherein sending the baseband signal comprises: sending the baseband signal by use of a wireless transmission component in a conventional wireless communication system.

6. The method as claimed in claim 1, wherein the data to be transmitted comprises that:
   a data frame structure is adopted for the data to be transmitted, and each frame is divided into two parts of a preamble sequence and a data sequence, the preamble sequence being configured for channel estimation and frame synchronization and the data sequence being valid data to be sent.

7. A data receiving method, comprising:
   receiving a baseband signal, the baseband signal being a signal obtained by processing data to be transmitted by use of a chaotic shape-forming filter;
   processing the baseband signal by use of a matched filter to obtain demodulated data;
   performing channel estimation by use of a preamble sequence in the demodulated data to obtain a channel parameter;

determining a signal judgment threshold at a present sampling moment on the basis of the channel parameter and the demodulated data; and performing symbol sampling on the demodulated data, and judging a sampled symbol by use of the signal judgment threshold to obtain a target signal.

8. The method as claimed in claim 7, wherein processing the baseband signal by use of the matched filter comprises: performing matched filter on the baseband signal to obtain an output signal of the matched filter; and extracting data from the output signal to obtain the demodulated data.

9. The method as claimed in claim 8, wherein the output signal of the matched filter is:

$$y(t) = \sum_{m=\lceil t \rceil - N_C N_p}^{\lceil t \rceil} r(m)g(t-m),$$

where y(t) is the output signal, t is a time variable, $\lceil t \rceil$ is a rounding-up operation over the variable t, $N_C$ represents a chaotic symbol oversampling rate, r(m) is an nth element of an input signal sequence of the matched filter, and g(t) is a time inverse function of a chaotic basis function, namely g(t)=p(−t).

10. The method as claimed in claim 7, wherein the matched filter adopts a finite impulse response filter structure.

11. The method as claimed in claim 7, wherein performing channel estimation by use of the preamble sequence in the demodulated data to obtain the channel parameter comprises:

performing channel estimation on the preamble sequence by use of a least square method to obtain channel parameters $\tau_l$ and $\alpha_l$, l being a multipath sequence number and $\tau_l$ and $\alpha_l$ being delay time and attenuation coefficient of an lth path respectively; and determining the signal judgment threshold at the present sampling moment on the basis of the channel parameter and the demodulated data comprises: calculating the signal judgment threshold by use of the following formula:

$$\theta_n = \sum_{l=0}^{L-1} \sum_{i=\lceil -\tau_l \rceil}^{-1} s_{n+i} C_{l,i},$$

where $s_{n+i}$ is a symbol at an n+ith sampling moment, L is the number of multiple paths, i is a symbol loop variable, and inter-symbol interference $C_{l,i}$ of an ith symbol of an lth path at the present moment is calculated as follows:

$$C_{l,i} = \alpha_l \int_{\tau=-\infty}^{\infty} p(\tau)p(\tau+\tau_l+i)d\tau.$$

12. The method as claimed in claim 7, wherein, if a sampling signal at an nth sampling moment is represented as $y_n$, signal judgment at this moment is performed as follows:

$$s_n = \begin{cases} 1 & (y_n \geq \theta_n) \\ -1 & (y_n < \theta_n) \end{cases},$$

where $\theta_n$ is the signal judgment threshold.

13. A chaotic shape-forming and corresponding matched filter-based wireless communication method, comprising:

Step 1): preparing data to be transmitted, wherein a data frame structure is adopted for the data to be transmitted, and each frame is divided into two parts of a preamble sequence and a data sequence, the preamble sequence being configured for channel estimation and frame synchronization and the data sequence being valid data to be sent;

Step 2): performing chaotic shape-forming filtering on a digital symbol to be transmitted to generate a baseband signal, wherein the baseband signal generated by use of a chaotic shape-forming filter is represented as follows:

$$x(t) = \sum_{m=\lfloor t \rfloor}^{\lfloor t \rfloor + N_p} s_m \cdot p(t-m),$$

where t is a time variable, $\lfloor t \rfloor$ represents a rounding-down operation over the variable t, $N_p$ is a parameter related to a chaotic basis function, m is a variable loop sequence number, $s_m$ represents an mth symbol to be transmitted, and an expression of p(t) is as follows:

$$p(t) = \begin{cases} (1-e^{-\beta})e^{\beta t}\left(\cos\omega t - \frac{\beta}{\omega}\sin\omega t\right), & t < 0 \\ 1 - e^{\beta(t-1)}\left(\cos\omega t - \frac{\beta}{\omega}\sin\omega t\right), & 0 \leq t < 1 \\ 0, & t \geq 1 \end{cases},$$

where $\beta$ and $\omega$ are chaotic system parameters;

Step 3): sending and transferring the baseband signal by use of a radio frequency component and transmitting antenna of a conventional wireless communication system;

Step 4): receiving a wireless signal by use of a conventional receiving antenna, and performing carrier frequency removal on the received signal to obtain the received baseband signal;

Step 5): performing matched filtering on the received baseband signal, wherein an output signal of a matched filter is:

$$y(t) = \sum_{m=\lceil t \rceil - N_C N_p}^{\lceil t \rceil} r(m)g(t-m),$$

where y(t) is the output signal, t is the time variable, $\lceil t \rceil$ is a rounding-up operation over the variable t, $N_C$ represents a chaotic symbol oversampling rate, r(m) is an mth element of an input signal sequence of the matched filter, and g(t) is a time inverse function of the chaotic basis function, namely g(t)=p(−t), the matched filter adopts a finite impulse response filter structure, the number of taps is $N_C N_p + 1$, and an mth tap coefficient $g_m$ is represented as follows:

$$g_m = g(t - \lceil t \rceil m), m = 0, 1, \ldots, N_C N_p;$$

Step 6): performing wireless channel estimation and multipath interference cancellation judgment threshold calculation, wherein a delay and attenuation parameter of a wireless channel are estimated by use of the preamble sequence and a channel estimation algorithm, a signal judgment threshold at a present moment is calculated by use of an estimated channel parameter in combination with a chaotic characteristic and a demodulated symbol, and for a wireless channel comprising L paths, an estimated delay and attenuation coefficient of an lth path of the channel are $\tau_l$ and $\alpha_l$ respectively, $l=0, 1, 2, \ldots, L-1$, response values exist only delay points of the L paths, and a channel impulse response is represented as $h(t)=\Sigma_{l=0}^{L-1}\alpha_l(t-\tau_l)$, where $\delta(t)$ is a unit impulse response, and $\tau_l$ and $\alpha_l$ are channel parameters; and Step 7): performing sampling judgment on the output signal of matched filtering, wherein symbol sampling is performed on the output signal of the matched filter in Step 5), and a sampling signal is judged by use of the judgment threshold calculated in Step 6) to obtain a decoded output signal.

14. The chaotic shape-forming and corresponding matched filter-based wireless communication method as claimed in claim 13, wherein, in Step 2), the chaotic shape-forming filter adopts a finite impulse response filter structure, the number of taps of the chaotic forming filter is $N_p+1$, tap coefficients from left to right are represented as $p_0$, $p_1, \ldots, p_{N_p}$ respectively, and an nth tap coefficient $p_n$ is represented as follows:

$$p_n = p(t - \lfloor t \rfloor - N_p + n), n = 0, 1, \ldots, N_p; \text{ and}$$

for the chaotic shape-forming filter, a valuing principle of $N_p$ is to make $p(t-N_p)$ close to 0, where $p(t-N_p)$ is a state value of the chaotic basis function at a moment $t-N_p$.

15. The chaotic shape-forming filter and matched filter-based wireless communication method as claimed in claim 14, wherein, in Step 5), the matched filter adopts a finite impulse response filter structure.

16. The chaotic shape-forming and matched filter-based wireless communication method as claimed in claim 13, wherein, in Step 6), a least square method is adopted for estimation of the channel parameter, and the estimated channel parameters $\tau_l$ and $\alpha_l$ are utilized, where l is the multipath sequence number, and $\tau_l$ and $\alpha_l$ are delay time and attenuation coefficient of the lth path respectively; and determining a signal judgment threshold at a present sampling moment on the basis of a channel parameter and demodulated data comprises: calculating the signal judgment threshold by use of the following formula:

$$\theta_n = \Sigma_{l=0}^{L-1} \Sigma_{i=\lceil -\tau_l \rceil}^{-1} s_{n+i} C_{l,i},$$

where $s_{n+i}$ is a symbol at an n+ith sampling moment, L is the number of multiple paths, i is a symbol loop variable, and inter-symbol interference $C_{l,i}$ of an ith symbol of an lth path at the present moment is calculated as follows:

$$C_{l,i} = a_l \int_{\tau=-\infty}^{\infty} p(\tau) p(\tau + \tau_l + i) d\tau.$$

17. The chaotic shape-forming and matched filter-based wireless communication method as claimed in claim 13, wherein, in Step 7), if a sampling signal at an nth sampling moment is represented as $y_n$, signal judgment at this moment is performed as follows:

$$s_n = \begin{cases} 1 & (y_n \geq \theta_n) \\ -1 & (y_n < \theta_n) \end{cases}.$$

* * * * *